(12) United States Patent
Obana (10) Patent No.: US 9,743,004 B2
(45) Date of Patent: Aug. 22, 2017

(54) ELECTRONIC APPARATUS INCLUDING ROTATABLY SUPPORTED STRUCTURE, AND FLEXIBLE PRINTED CIRCUIT BOARD

(71) Applicant: CANON KABUSHIKI KAISHA, Tokyo (JP)

(72) Inventor: Shinji Obana, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/839,777

(22) Filed: Aug. 28, 2015

(65) Prior Publication Data

US 2016/0073032 A1    Mar. 10, 2016

(30) Foreign Application Priority Data

Sep. 5, 2014    (JP) .................................. 2014-181309

(51) Int. Cl.
H04N 5/232    (2006.01)
H04N 5/225    (2006.01)

(52) U.S. Cl.
CPC ....... *H04N 5/23293* (2013.01); *H04N 5/2251* (2013.01); *H04N 5/2252* (2013.01)

(58) Field of Classification Search
CPC .. H04N 5/2251; H04N 5/2252; H04N 5/2253; H04N 5/2254; H04N 5/23293; H04N 5/225; H04N 5/232
See application file for complete search history.

(56) References Cited

U.S. PATENT DOCUMENTS

| | | | | |
|---|---|---|---|---|
| 2005/0060842 A1* | 3/2005 | Ibaraki | ................. | H01R 35/025 16/295 |
| 2009/0126976 A1* | 5/2009 | Iida | ........................ | H05K 1/028 174/254 |
| 2009/0207336 A1* | 8/2009 | Lee | ........................ | H05K 1/028 349/58 |
| 2014/0049895 A1* | 2/2014 | Lee | ..................... | H05K 5/0017 361/679.28 |

FOREIGN PATENT DOCUMENTS

JP    2005-090707 A    4/2005

* cited by examiner

*Primary Examiner* — Abdelaaziz Tissire
(74) *Attorney, Agent, or Firm* — Cowan, Liebowitz & Latman, P.C.

(57) ABSTRACT

A technique which improves the workability of wrapping an FPC around a shaft, and prevents breakage of the FPC from being caused during wrapping operation. A shaft is supported by an apparatus main unit and is disposed in a center of rotation of a structure. The FPC is wrapped around and held by the shaft using a joining member. The FPC has a wrapping start portion from which wrapping is started, and a wrapping body portion including a wiring portion. The width of the wrapping body portion in a thrust direction of the shaft is larger than the width of the wrapping start portion. An expansion portion is arranged between the wrapping start portion and the wrapping body portion. The width of the expansion portion in the thrust direction continuously expands from the width of the wrapping start portion to that of the wrapping body portion.

8 Claims, 8 Drawing Sheets

ELECTRONIC APPARATUS INCLUDING ROTATABLY SUPPORTED STRUCTURE, AND FLEXIBLE PRINTED CIRCUIT BOARD

BACKGROUND OF THE INVENTION

Field of the Invention

The invention relates to an electronic apparatus and a flexible printed circuit board, and more particularly, to a configuration of a flexible printed circuit board of an electronic apparatus including a structure supported in a manner rotatable with respect to an apparatus main unit, the flexible printed circuit board electrically connecting the apparatus main unit and the structure.

Description of the Related Art

In recent years, digital cameras including a display device, such as a liquid crystal panel, which is provided in a manner rotatable with respect to an apparatus main unit, have come into widespread use. The user of such a digital camera is capable of rotating the display device, thereby checking an object or the like displayed on the display device from various angles with respect to the apparatus main unit. Electronic apparatuses thus improved in user-friendliness by causing a structure, such as the display device, to be supported in a manner rotatable with respect to the apparatus main unit have come into widespread use.

To electrically connect the apparatus main unit and the structure of the electronic apparatus, a flexible printed circuit board is widely used. For example, a known form of wiring using the flexible printed circuit board has a configuration in which the flexible printed circuit board is wrapped around a rotating shaft that supports the structure, via a double-sided tape or the like (see Japanese Patent Laid-Open Publication No. 2005-90707). In the case of such a configuration, when the flexible printed circuit board is wrapped around the shaft, a repelling force against the wrapping is generated in the flexible printed circuit in a direction of causing the flexible printed circuit board to come off from the shaft.

On the other hand, there has conventionally been a strong demand for downsizing the electronic apparatus, and one method for achieving the downsizing of the electronic apparatus is to reduce the diameter of the shaft around which the flexible printed circuit board is wrapped. However, along with reduction of the diameter of the shaft, the repelling force generated in the flexible printed circuit board in the direction of coming off from the shaft is increased, and hence there is a possibility of making it difficult to perform an operation for wrapping the flexible printed circuit board around the shaft. Further, if the flexible printed circuit board is wrapped around the shaft by applying a large force so as to increase adherence between the shaft and the double-side tape, there is an increase in the risk of breaking the wiring in the flexible printed circuit board.

SUMMARY OF THE INVENTION

The invention provides a technique which improves the workability of wrapping a flexible printed circuit board around a shaft, and prevents breakage of the flexible printed circuit board from being caused during wrapping operation.

In a first aspect of the invention, there is provided an electronic apparatus including an apparatus main unit and a structure supported rotatably with respect to the apparatus main unit, comprising a shaft that is supported by the apparatus main unit and is disposed in a center of rotation of the structure, and a flexible printed circuit board that is wrapped around and held by an outer peripheral surface of the shaft via a joining member, wherein the flexible printed circuit board includes a wrapping start portion from which wrapping of the flexible printed circuit board around the shaft is started, a wrapping body portion having a wiring portion, a width of the wrapping body portion in a thrust direction of the shaft being larger than a width of the wrapping start portion, and an expansion portion that is provided between the wrapping start portion and the wrapping body portion, a width of the expansion portion in the thrust direction of the shaft continuously expanding from the width of the wrapping start portion to the width of the wrapping body portion.

In a second aspect of the invention, there is provided a flexible printed circuit board that has a substantially strip shape, comprising a front end portion that is formed at one end of the flexible printed circuit board in a direction of length of the flexible printed circuit board, a body portion that has a wiring portion and is formed at another end of the flexible printed circuit board in the direction of length of the flexible printed circuit board, and a connection portion that connects the front end portion and the body portion, wherein in a direction of width of the flexible printed circuit board, which is orthogonal to the direction of length and a direction of thickness of the flexible printed circuit board, a width of the body portion is larger than a width of the front end portion, and a width of the connection portion is continuously expanded from the width of the front end portion to the width of the body portion.

According to the invention, it is possible to improve the workability of wrapping the flexible printed circuit board around the shaft, and prevent breakage of the flexible printed circuit board from being caused during wrapping operation.

Further features of the invention will become apparent from the following description of exemplary embodiments (with reference to the attached drawings).

DESCRIPTION OF THE EMBODIMENTS

The invention will now be described in detail below with reference to the accompanying drawings showing an embodiment thereof. In the embodiment, as an electronic apparatus according to the embodiment of the invention, an image pickup apparatus (so-called digital camera) will be described which includes an apparatus main unit having an image pickup function, and a display unit as an example of a structure supported in a manner rotatable with respect to the apparatus main unit. However, this is not limitative, but the electronic apparatus according to the invention can be widely applied to electronic apparatuses including an apparatus main unit and a structure rotatably attached to the apparatus main unit.

Figure 1A:
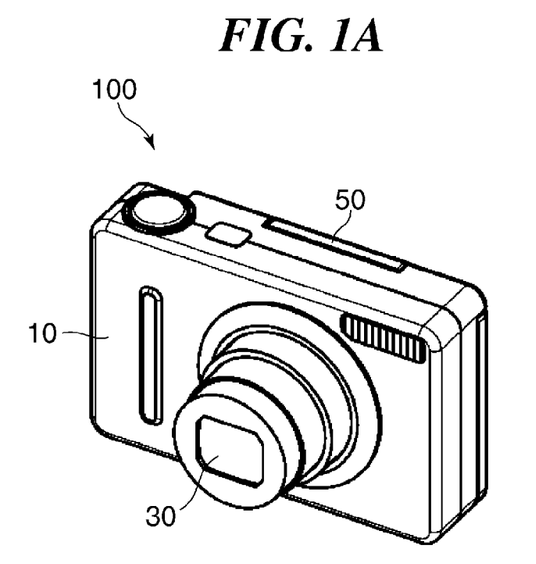
FIG. 1A is a perspective view of the appearance of an image pickup apparatus according to an embodiment of the invention, with a display unit accommodated in a rear side thereof.
Figure 1B:
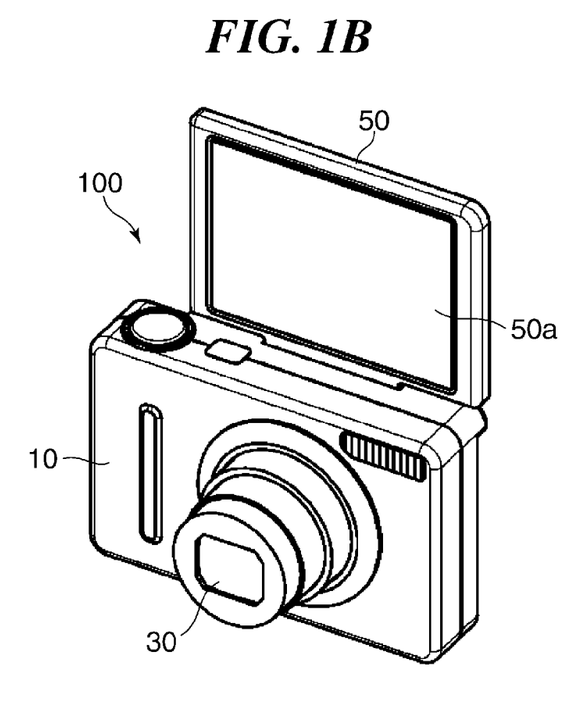
FIG. 1B is a perspective view of the appearance of the image pickup apparatus with the display unit rotated to protrude from an upper surface thereof.

FIGS. 1A and 1B are perspective views of the appearance of the image pickup apparatus 100 according to the embodiment of the invention. The image pickup apparatus 100 is generally comprised of the apparatus main unit 10 (hereinafter referred to as the "main unit 10"), a lens barrel unit 30 provided in a front central portion of the main unit 10, and a display unit 50 provided in a rear surface of the main unit 10.

The lens barrel unit 30 has a structure in which a plurality of lens groups (not shown) included therein can be moved in an optical axis direction, and is configured to be capable of shifting between a photographing position protruding from the main unit 10 and a retracted position retracted within the main unit 10 with the lens groups accommodated therein.

The display unit 50 is supported via a hinge in a manner rotatable with respect to the main unit 10. As will be described hereinafter with reference to FIGS. 2A and 2B, the display unit 50 includes a display device, such as a liquid crystal display or an organic EL display. The display device is configured to be capable of displaying live view images, photographed images, and photographing conditions, based on image pickup signals output from an image pickup device (not shown) incorporated in the main unit 10.

The image pickup apparatus 100 includes an attitude detection sensor (not shown) for detecting a rotational angle of the display unit 50 with respect to the main unit 10. FIG. 1A shows the image pickup apparatus 100 with the display unit 50 received in the rear side of the main unit 10. In this state, a screen 50a (not shown in FIG. 1A) of the display device faces rearward from the main unit 10. On the other hand, FIG. 1B shows the image pickup apparatus 100 with the display unit 50 rotated with respect to the main unit 10 to protrude from the upper surface of the main unit 10. In this state, the screen 50a of the display device faces forward from the main unit 10, i.e. toward an object.

For example, a photographer rotates the display unit 50 to change the attitude of the display unit 50 from the FIG. 1A state to the FIG. 1B state. This causes the attitude detection sensor to detect the rotation of the display unit 50, and accordingly, a controller (microcomputer) provided in the main unit 10 performs display control for causing an image displayed thus far on the screen 50a of the display unit to be inverted upside down. This makes it possible for the photographer to easily recognize information displayed on the screen 50a of the display unit from the object side.

Figure 2A:
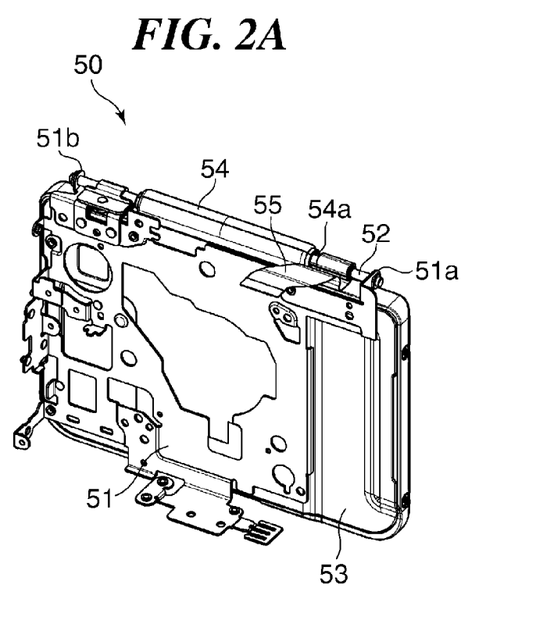
FIG. 2A is a perspective view of the display unit included in the image pickup apparatus shown in FIG. 1A.
Figure 2B:
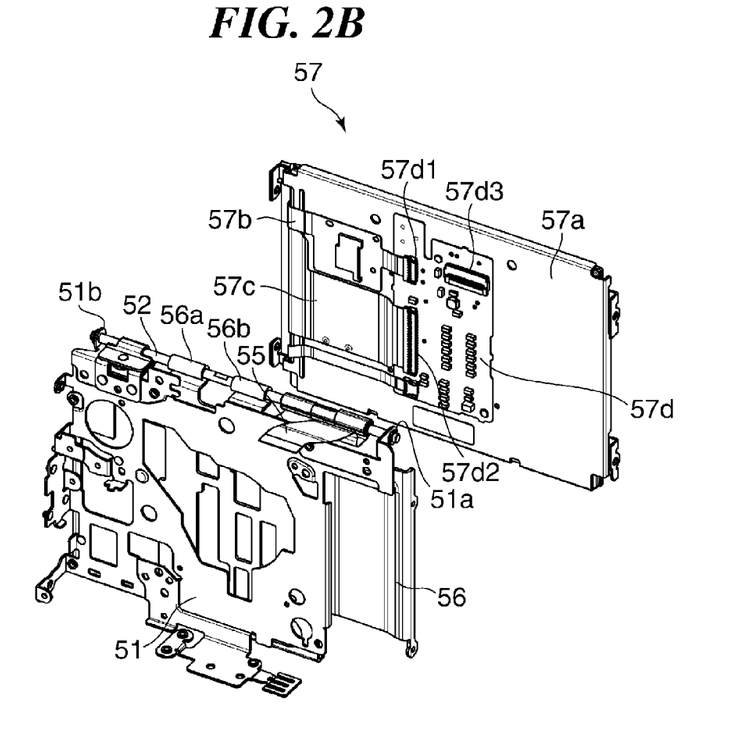
FIG. 2B is an exploded perspective view of the display unit included in the image pickup apparatus shown in FIG. 1A.

FIG. 2A is a perspective view of the display unit 50 in a state attached to a body chassis 51 constituting the main unit 10. FIG. 2B is an exploded perspective view of the display unit 50 in the state shown in FIG. 2A. The body chassis 51 includes bearings 51a and 51b. The display unit 50 includes a shaft 52, a display section cover 53, a display section frame 54, a flexible printed circuit board (hereinafter referred to as the "FPC") 55, a display section chassis 56, and a display device 57.

The display section chassis 56 includes arm portions 56a and 56b. The shaft 52 disposed in the center of rotation of the display unit 50 is inserted through the bearings 51a and 51b of the body chassis 51. The shaft 52 is joined to the arm portions 56a and 56b of the display section chassis 56 using a joining method, such as spot welding. This causes the shaft 52 to be rotatable in unison with the display section chassis 56 with respect to the body chassis 51.

The display device 57 includes a display panel 57a, FPCs 57b and 57c, and a relay board 57d. A liquid crystal display (LCD) or an organic EL display, for example, is used as the display device 57. The relay board 57d has connectors 57d1, 57d2, and 57d3 mounted thereon, and is affixed to the rear surface of the display panel 57a and is thereby secured thereto. The FPCs 57b and 57c extending from the display panel 57a are bent from the display panel 57a through approximately 180°, and are connected to the connectors 57d1 and 57d2 mounted on the relay board 57d, respectively.

The FPC 55 is wrapped around and held on the outer peripheral surface of the shaft 52 using a double-side tape 58 (see FIGS. 3A to 3D) which is an example of a joining member. The FPC 55 is a component which serves to connect the display device 57 and a control circuit board 10a (see FIG. 4, referred to hereinafter) arranged within the main unit 10. Note that the detailed structure of the FPC 55 will be described hereinafter.

The display section frame 54 and the display section cover 53 are components forming an exterior of the display unit 50. As shown in FIG. 2A, the display section frame 54 contains the display section chassis 56 and the display device 57, and is fixed to the display section chassis 56 e.g. with screws. The display section frame 54 is formed with a shaft insertion groove 54a, and is configured such that when the display section frame 54 is fixed to the display section chassis 56, part of the shaft 52 and the FPC 55 is exposed from the shaft insertion groove 54a. By assembling the lens barrel unit 30, the control circuit board 10a, an exterior cover, and so forth, to the body chassis 51, the image pickup apparatus 100 is completed.

FIGS. 3A to 3D are views showing the appearance form of the FPC 55 and changes in the state of the FPC 55 as it is wrapped around the shaft 52. The FPC 55 has a substantially strip shape, and a front end portion formed at one end of the FPC 55 in a direction of length thereof is used as a wrapping start portion 55a for starting the wrapping of the FPC 55 around the shaft 52. The wrapping start portion 55a has an outer shape width size W1 in a direction of width of the FPC 55, which is orthogonal to the direction of length and a direction of thickness of the FPC 55 (the direction of width of the FPC 55 is an X direction indicated in FIGS. 3A and 3B, and is a thrust direction of the shaft 52). Further, a wrapping body portion 55c having an outer shape width size W3 is formed at the other end of the FPC 55 in the direction of length thereof. Here, the outer shape width sizes W1 and W3 are set to have the relationship of "W1<W3". A connection portion connecting the wrapping start portion 55a and the wrapping body portion 55c is formed as an expansion portion 55b of which the appearance form is gradually expanded from the outer shape width size W1 of the wrapping start portion 55a to the outer shape width size W3 of the wrapping body portion 55c.

Figure 3A:
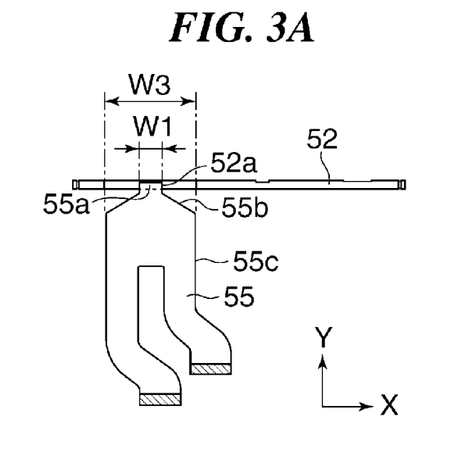
FIGS. 3A to 3D are schematic views showing the appearance form of a flexible printed circuit board (FPC) of the image pickup apparatus shown in FIG. 1A, and changes in a state of the FPC as the FPC is wrapped around a shaft.
Figure 3B:
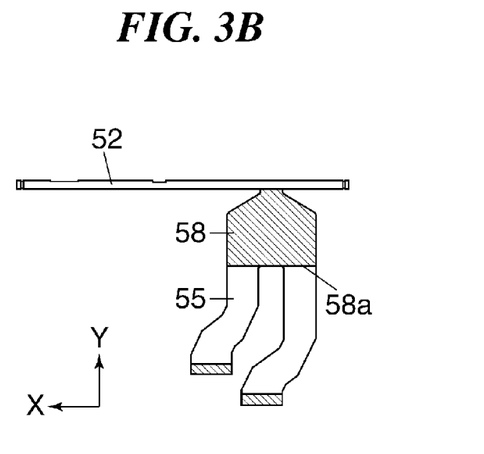

The double-side tape 58 is affixed in advance on one side of the FPC 55 within a predetermined range including the wrapping start portion 55a. FIGS. 3A and 3B are plan views of states of the FPC 55 in which the wrapping start portion 55a is affixed to the shaft 52, as viewed from the front and reverse sides of the FPC 55, respectively.

Figure 3C:
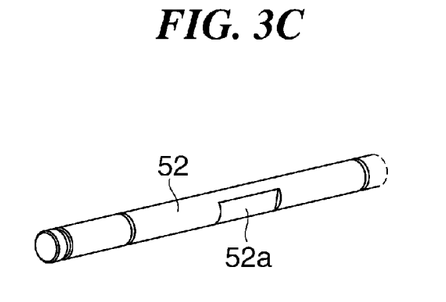
Figure 3D:
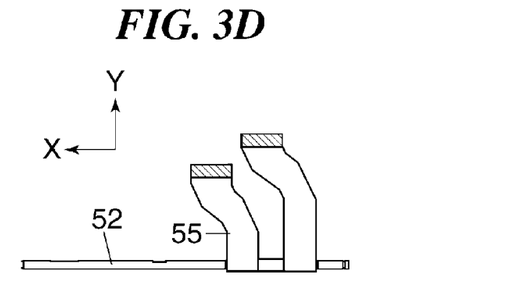

As shown in FIG. 3C, a portion of the shaft 52 is formed with a groove 52a having a flat bottom surface. The groove 52a has a width size set to be slightly longer than the outer shape width size W1 of the wrapping start portion 55a. When wrapping the FPC 55 around the shaft 52, first, the wrapping start portion 55a of the FPC 55 is brought into contact with the inside of the groove 52a, whereby the FPC 55 is positioned with respect to the thrust direction of the shaft 52 (X direction). Then, a front end portion of the wrapping start portion 55a and a cutout end surface of the groove 52a caused to be aligned in parallel with each other, whereby the FPC 55 is positioned with respect to a diametrical direction of the shaft 52 (Y direction). After positioning of the FPC 55 with respect to the shaft 52 has been thus completed, the FPC 55 is wrapped around the shaft 52 via the double-side tape 58. When the FPC 55 is wrapped around the shaft 52 up to a trailing end 58a of the double-side tape 58, the wrapping operation is completed, as shown in FIG. 3D.

The present embodiment is configured such that the FPC 55 is wrapped around the shaft 52 through a plurality of turns. In this case, when a first turn of the FPC 55 is wrapped, the double-side tape 58 is affixed to the shaft 52, and when second and subsequent turns of the FPC 55 are wrapped, the double-side tape 58 is further affixed to a portion of the FPC 55 having already been wrapped around the shaft 52. Therefore, the first turn of wrapping has the smallest wrapping diameter.

Assuming that an FPC which has the same thickness and the same width from a wrapping start portion to a wrapping end portion thereof is wrapped around the shaft, a repelling force generated, by bending of the FPC, in a direction of coming-off of the FPC from the shaft, is larger when a first turn of the FPC is wrapped than when second and subsequent turns of the same are wrapped. The FPC 55, however, is configured such that it has an outer shape width size continuously increased from W1 to W3 (W1<W3) from the wrapping start portion 55a to the wrapping body portion 55c. Therefore, the repelling force generated by bending the FPC 55 becomes the smallest when the wrapping is started, and gradually becomes larger as the wrapping operation proceeds, whereby it is possible to improve workability of wrapping the FPC 55 around the shaft 52.

Figure 4:
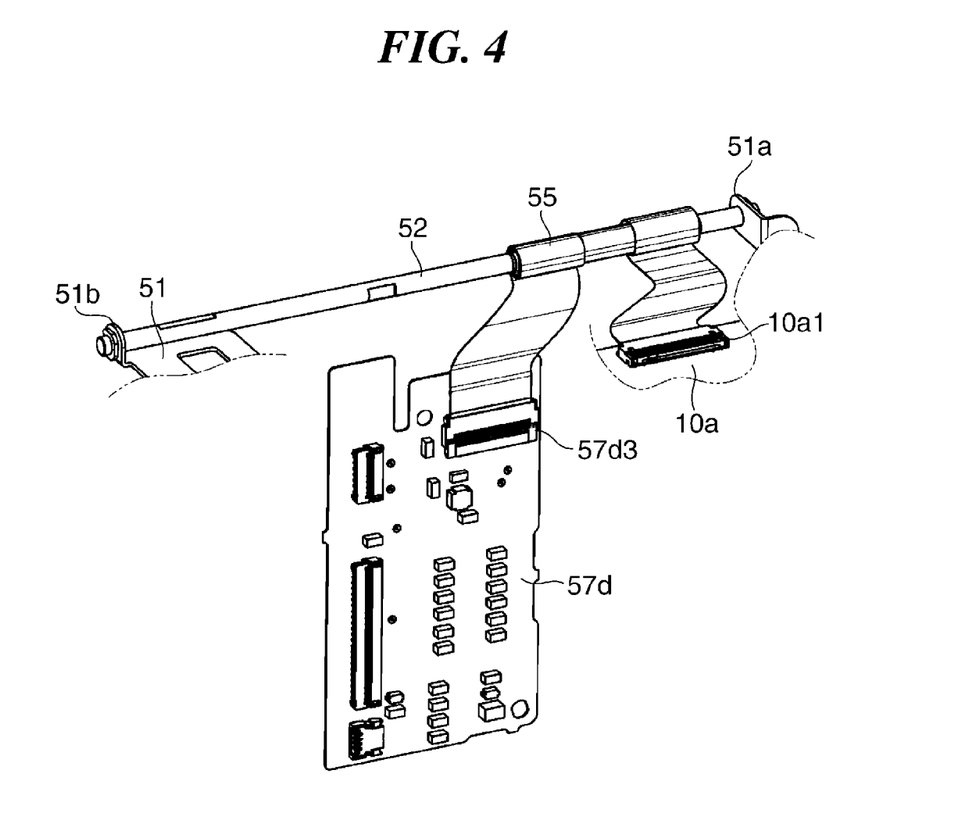
FIG. 4 is a perspective view of the FPC in a state incorporated in the image pickup apparatus shown in FIG. 1A.

FIG. 4 is a perspective view of the FPC 55 incorporated in the image pickup apparatus 100. In the illustrated example, only components necessary for clearly indicating portions for connecting the FPC 55 to the shaft 52 are shown. After completion of the wrapping operation for wrapping the FPC 55 around the shaft 52, the FPC 55 is electrically connected to the relay board 57d of the display device 57 and the control circuit board 10a equipped in the main unit 10. Specifically, the control circuit board 10a has a connector 10a1 mounted thereon, and the wrapping body portion 55c of the FPC 55 is bifurcated into two parts. One of the two parts of the bifurcated FPC 55 has an end thereof connected to the connector 10a1, and the other of the two parts of the FPC 55 has an end thereof connected to the connector 57d3 mounted on the relay board 57d.

Figure 5A:
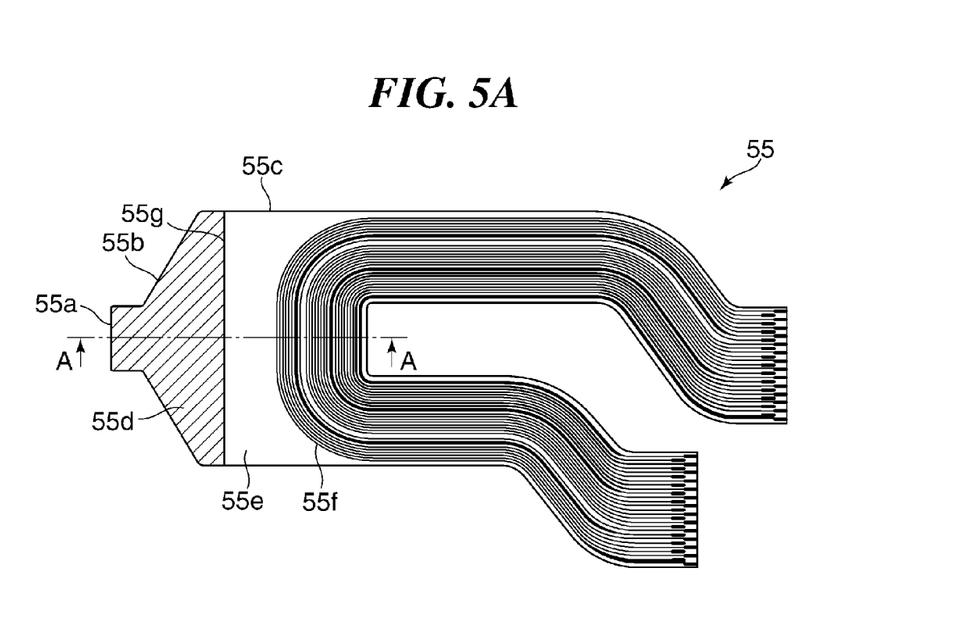
FIG. 5A is a development of the FPC shown in FIGS. 3A to 3D.
Figure 5B:
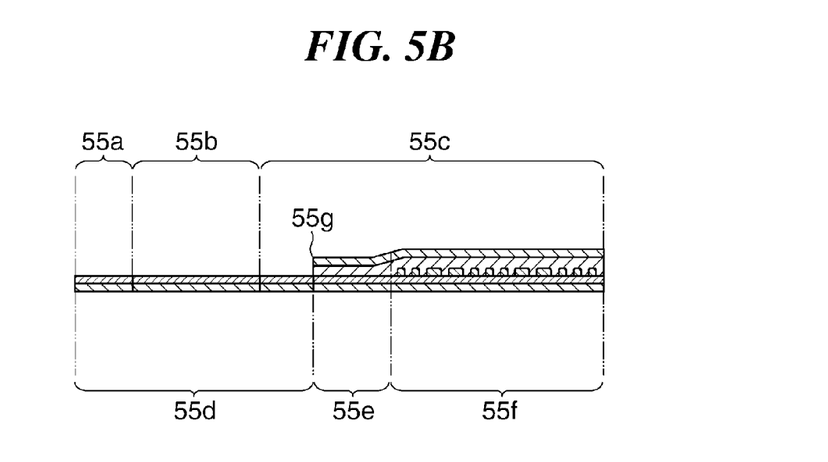
FIG. 5B is a cross-sectional view of the FPC shown in FIGS. 3A to 3D.

FIG. 5A is a development of the FPC 55, and FIG. 5B is a cross-sectional view taken on line A-A of FIG. 5A. The FPC 55 includes a coverlay opening area 55d where a coverlay is made open. The coverlay opening area 55d includes the wrapping start portion 55a, the expansion portion 55b, and part of the wrapping body portion 55c.

The wrapping body portion 55c is provided with a conductor-removed portion 55e and a wiring portion 55f. The conductor-removed portion 55e is formed in the wrapping body portion 55c by removing conductor portions of the FPC 55 in an area of the wrapping body portion 55c adjacent to the expansion portion 55b, e.g. by etching. As a consequence, in the embodiment, the conductor-removed portion 55e is formed between the coverlay opening area 55d and the wiring portion 55f, whereby the coverlay opening area 55d has a coverlay opening end 55g linearly formed in parallel with the thrust direction of the shaft 52 on a side toward the wrapping body portion 55c. The wiring portion 55f is an area having two wiring groups bifurcated such that one wiring group has an end for being connected to the connector 10a1 mounted on the control circuit board 10a provided on the main unit 10 and the other wiring group has an end for being connected to the connector 57d3 mounted on the relay board 57d of the display device 57.

As shown in FIG. 5B, the conductor-removed portion 55e has a thickness obtained by adding the thickness of a coverlay film and the thickness of an adhesive for joining the coverlay film to the thickness of the coverlay opening area 55d. Therefore, the repelling force generated by bending the FPC 55 becomes smaller in the coverlay opening area 55d than in the conductor-removed portion 55e. Further, the wiring portion 55f has a thickness obtained by further adding the thickness of the conductor to the thickness of the conductor-removed portion 55e, and hence the repelling force generated by bending the FPC 55 becomes smaller in the conductor-removed portion 55e than in the wiring portion 55f. As described above, when the FPC 55 is wrapped around the shaft 52, the repelling force generated by bending the FPC 55 is the smallest at the start of wrapping the FPC 55. This means that the thickness of the FPC 55 stepwise increases from the wrapping start portion 55a toward the wiring portion 55f, and hence it is possible to easily perform a wrapping operation.

The coverlay opening area 55d is configured such that the outer shape width of the FPC 55 stepwise increases in the direction of length thereof from the wrapping start portion 55a via the expansion portion 55b to the wrapping body portion 55c. As a consequence, the repelling force generated by bending the FPC 55 becomes the smallest in the wrapping start portion 55a in the coverlay opening area 55d, and stepwise increases in the order of the coverlay opening area 55d including the wrapping start portion 55a, the expansion portion 55b, and the part of the wrapping body portion 55c, the conductor-removed portion 55e, and the wiring portion 55f. Thus, by taking the operation for wrapping the FPC 55 around the shaft 52 into consideration, the FPC 55 is configured such that the thickness and outer shape width are reduced at a portion from which the wrapping is started and where the repelling force is large, so that it is possible to easily perform the wrapping operation.

Figure 6:
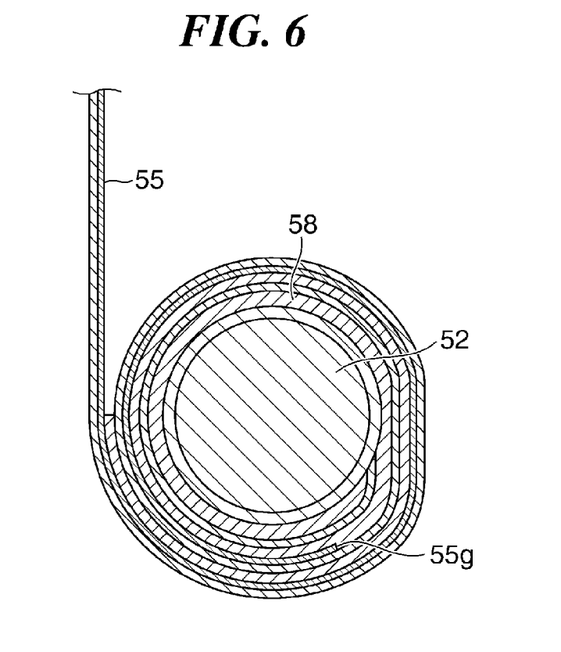
FIG. 6 is a cross-sectional view of the FPC shown in FIGS. 3A to 3D in a state wrapped around the shaft.

FIG. 6 is a cross-sectional view of the FPC 55 in a state wrapped around the shaft 52. As described hereinabove, when an FPC having the same thickness and the same width is wrapped around the shaft, the repelling force generated by bending the FPC is the largest when the first turn of the FPC is wrapped. When the second and subsequent turns of the FPC are wrapped, the wrapping diameter increases since the thickness of the FPC itself and the thickness of the double-side tape are added to the diameter of the shaft as the wrapping proceeds, and therefore the repelling force generated by bending the FPC becomes smaller than when the first turn of the FPC is wrapped.

On the other hand, in the embodiment, the FPC 55 is configured such that the outer shape width size of the FPC 55 is continuously increased from W1 to W3 from the wrapping start portion 55a to the wrapping body portion 55c of the FPC 55, whereby the repelling force generated at the start of the wrapping operation is minimized. In addition, the embodiment is configured such that the coverlay opening area 55d has a length which makes it possible to wrap at least one turn of the FPC around the shaft 52 by using only the coverlay opening area 55d from the wrapping start portion 55a. More specifically, the coverlay opening end 55g is arranged at a position where at least one turn of the FPC 55 has been wrapped around the shaft 52. This makes it possible to minimize the repelling force generated in the FPC 55 when the first turn of the same is wrapped, and therefore it is possible to improve workability of wrapping the FPC 55 around the shaft 52.

Figure 7:
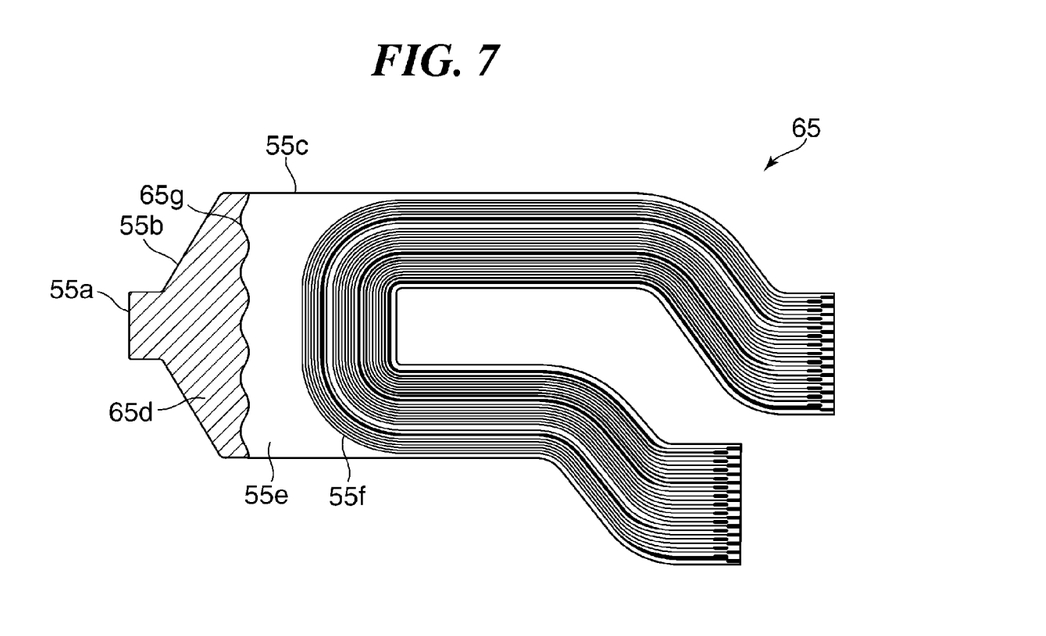
FIG. 7 is a development of a first variation of the FPC shown in FIGS. 5A and 5B.

Next, a description will be given of an FPC 65 which is a first variation of the FPC 55. FIG. 7 is a development of the FPC 65. Note that in the FPC 65, substantially the same components as those of the FPC 55 are denoted by the same reference numerals, and detailed description thereof is omitted. Further, the arrangement form of the FPC 65 within the image pickup apparatus 100 is the same as the arrangement form of the FPC 55, and description thereof is omitted.

The FPC 65 includes the wrapping start portion 55a, the expansion portion 55b, and the wrapping body portion 55c. Further, the FPC 65 has a coverlay opening area 65d including the wrapping start portion 55a, the expansion portion 55b, and part of the wrapping body portion 55c, the conductor-removed portion 55e, and the wiring portion 55f. Although in the FPC 55 of the embodiment described above, the coverlay opening end 55g of the coverlay opening area 55d has an end face which is linear in shape and parallel to the thrust direction of the shaft 52, in the FPC 65 as the first variation of the FPC 55, a coverlay opening end 65g of the coverlay opening area 65d has an end face which is wavy in shape, with the direction of wavy displacement (direction of amplitude) corresponding to the diametrical direction of the shaft 52.

For this reason, as the FPC 65 is wrapped around the shaft 52, at a boundary portion between the coverlay opening area 65d and the conductor-removed portion 55e, where a change in thickness occurs, the FPC 65 is wrapped from peak portions of the end face wavy in shape, and then all wavy portions including valley portions are gradually wrapped around the shaft 52. In other words, the thickness of the FPC 65 is gently increased at the boundary portion between the coverlay opening area 65d and the conductor-removed portion 55e, so that it is possible to more gently increase the repelling force generated by bending the FPC 65. This makes it possible to wrap the FPC 65 and the double-side tape 58 around the shaft 52 in a state more stably brought into close contact with each other.

Note that although in the FPC 65, the end face of the coverlay opening end 65g is formed into a gentle wavy shape, such as a sine wave shape, this is not limitative, but even when the end face of coverlay opening end 65g is formed into a shape of protrusions and depressions, such as a triangular wave shape or a saw wave shape, including peak portions and valley portions each having sharp edge portions, it is possible to obtain the same advantageous effects as provided by the FPC 65.

Figure 8A:
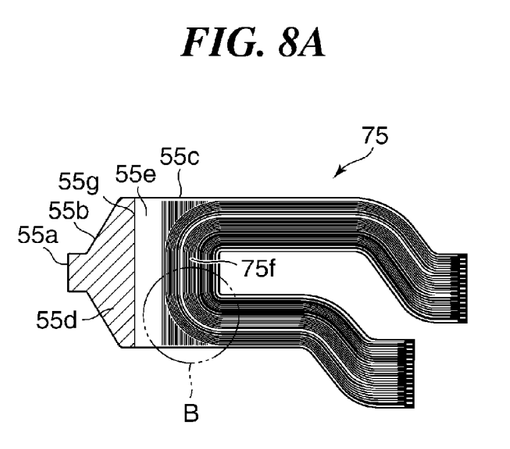
FIG. 8A is a development of a second variation of the FPC shown in FIGS. 5A and 5B.
Figure 8B:
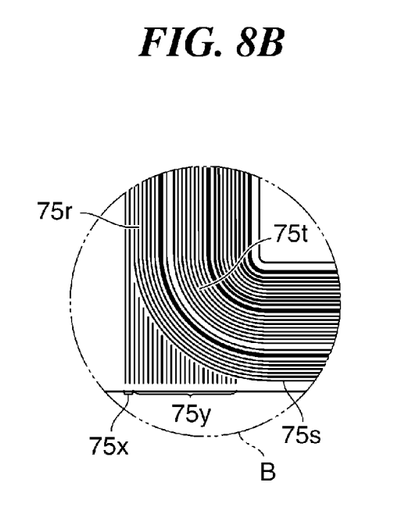
FIG. 8B is an enlarged view of part of the second variation of the FPC shown in FIGS. 5A and 5B.

Next, a description will be given of an FPC 75 which is a second variation of the FPC 55. FIG. 8A is a development of the FPC 75, and FIG. 8B is an enlarged view of an area B appearing in FIG. 8A. Note that in the FPC 75, substantially the same components as those of the FPC 55 are denoted by the same reference numerals, and detailed description thereof is omitted. Further, the arrangement form of the FPC 75 within the image pickup apparatus 100 is the same as the arrangement form of the FPC 55, and hence description thereof is omitted.

The FPC 75 includes the wrapping start portion 55a, the expansion portion 55b, and the wrapping body portion 55c. Further, the FPC 75 has the coverlay opening area 55d including the wrapping start portion 55a, the expansion portion 55b, and part of the wrapping body portion 55c, the conductor-removed portion 55e, and a wiring portion 75f. The wiring portion 75f includes a first linear wiring portion 75r, a second linear wiring portion 75s, and a curved wiring portion 75t. The first linear wiring portion 75r extends in a direction parallel to the thrust direction of the shaft 52 in an outer periphery of the wiring portion 75f. The second linear wiring portion 75s extends in a direction orthogonal to the thrust direction of the shaft 52. The curved wiring portion 75t connects the first linear wiring portion 75r and the second linear wiring portion 75s by a gentle curve in the outer periphery of the wiring portion 75f.

The FPC 75 has portions where the thickness changes as the FPC 75 is wrapped around the shaft 52. More specifically, the portions include the coverlay opening end 55g, and a boundary portion between the conductor-removed portion 55e and the wiring portion 75f. When the FPC 75 is wrapped around the shaft 52, pressure applied to the FPC 75 is partially concentrated in the portion changed in thickness, whereby excessive pressure may be concentrated e.g. on a signal line at an outermost periphery of the wiring portion 75f, to cause breakage of the signal line. To solve this problem, in the second variation, in the wiring portion 75f, a first dummy wiring portion 75x is provided, with a predetermined gap provided between the first dummy wiring portion 75x, and the first linear wiring portion 75r and the conductor-removed portion 55e. The first dummy wiring portion 75x is electrically insulated from a signal line of the outermost periphery of the first linear wiring portion 75r. This makes it possible, when the FPC 75 is wrapped around the shaft 52, to prevent excessive pressure from being concentrated on the outermost periphery of the first linear wiring portion 75r, whereby it is possible to prevent the breakage of the signal line.

Further, in a case where the conductor is eliminated in an area surrounded by an outermost periphery of the curved wiring portion 75t, the first dummy wiring portion 75x, and an outer shape end of the FPC 75, when the FPC 75 is wrapped around the shaft 52, excessive pressure may be concentrated on the outermost periphery of the curved wiring portion 75t. To solve this problem, in the second variation, a second dummy wiring portion 75y is formed in the area surrounded by the outermost periphery of the curved wiring portion 75t, the first dummy wiring portion 75x, and the outer shape end of the FPC 75. The second dummy wiring portion 75y is electrically insulated from the signal line of the outermost periphery of the wiring portion 75f. This makes it possible to cause the FPC 75 to make the wiring portion 75f and an area without wiring, uniform in thickness, in the thrust direction of the shaft 52. Therefore, when the FPC 75 is wrapped around the shaft 52, it is possible to prevent excessive pressure from being concentrated on the outermost periphery of the curved wiring portion 75t, whereby it is possible to prevent the breakage of the signal line.

Further, in the FPC 75, the first dummy wiring portion 75x and the second dummy wiring portion 75y have a shape of stripes parallel to the thrust direction of the shaft 52. More specifically, the first dummy wiring portion 75x and the second dummy wiring portion 75y each have a structure in which a plurality of wiring lines parallel to the thrust direction of the shaft 52 are arranged at predetermined spaced intervals in the diametrical direction of the shaft 52. This makes it possible to lessen the repelling force generated by bending the FPC 75 when the FPC 75 is wrapped around the shaft 52. Therefore, it is possible to prevent the repelling force from being excessively increased even when the first dummy wiring portion 75x and the second dummy wiring portion 75y are provided, whereby it is possible to stably wrap the FPC 75 and the double-side tape 58 around the shaft 52 in a state more stably brought into close contact with each other.

Note that the first dummy wiring portion 75x is arranged between the second dummy wiring portion 75y and the conductor-removed portion 55e. Therefore, there is a possibility of the first dummy wiring portion 75x being broken when the FPC 75 is wrapped around the shaft 52. Further, if the first dummy wiring portion 75x is integrally formed with a signal line, closest to the conductor-removed portion 55e, of the first linear wiring portion 75r of the FPC 75 (such that a conductor of printed wiring and a conductor of dummy wiring are continuous with each other), it may contrariwise cause breakage of the wiring portion 75f. However, the second dummy wiring portion 75y has a low possibility of breakage, and hence the second dummy wiring portion 75y may be configured such that part thereof is integrally formed with signal lines of the outermost periphery of the wiring portion 75f (the conductor of the printed wiring and the conductor of the dummy wiring are made continuous with each other), to thereby further improve the effect of preventing breakage of the FPC 75 during assembly thereof.

Figure 9A:
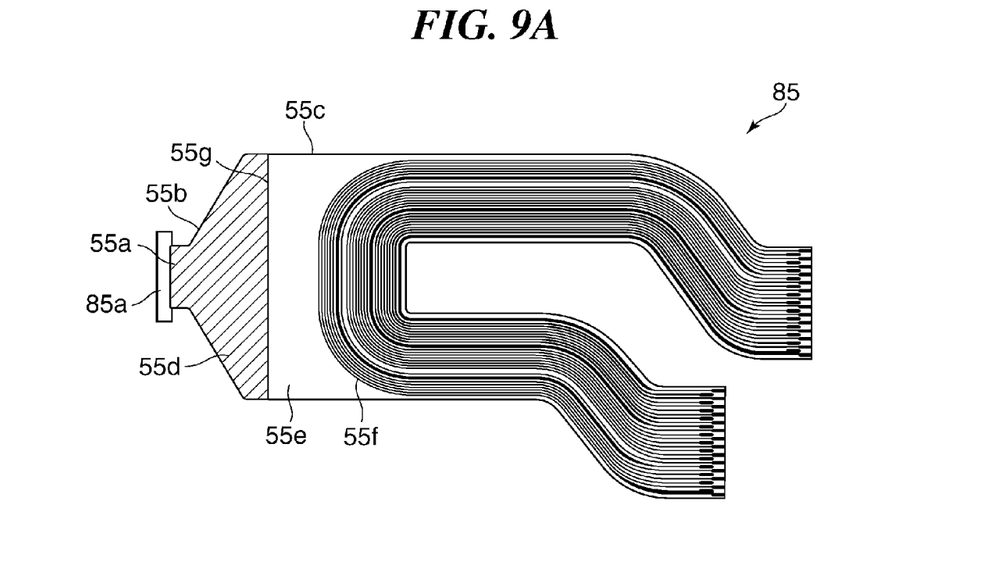
FIG. 9A is a development of a third variation of the FPC shown in FIGS. 5A and 5B.
Figure 9B:
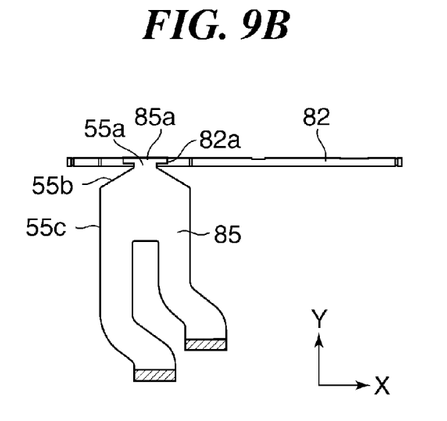
FIGS. 9B and 9C are plan views of the third variation of the FPC shown in FIGS. 5A and 5B in a state in which the FPC starts to be wrapped around the shaft.
Figure 9C:
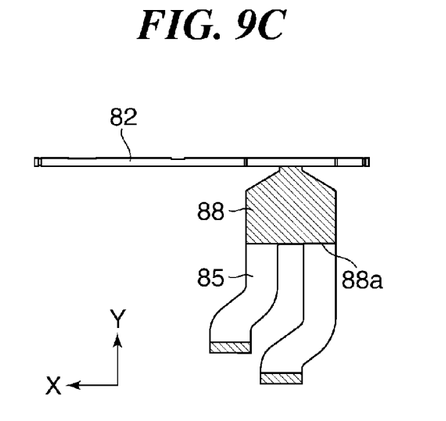

Next, a description will be given of an FPC 85 which is a third variation of the FPC 55. FIG. 9A is a development of the FPC 85, and FIGS. 9B and 9C are schematic plan views of the FPC 85 in a state in which the FPC 85 starts to be wrapped around a shaft 82. Note that in the FPC 85, substantially the same components as those of the FPC 55 are denoted by the same reference numerals, and detailed description thereof is omitted. Further, the arrangement form of the FPC 85 within the image pickup apparatus 100 is the same as the arrangement form of the FPC 55, and hence description thereof is omitted.

The FPC 85 includes a registration portion 85a, the wrapping start portion 55a, the expansion portion 55b, and the wrapping body portion 55c. Further, the FPC 85 has the coverlay opening area 55d including the wrapping start portion 55a, the expansion portion 55b, and part of the wrapping body portion 55c, the conductor-removed portion 55e, and the wiring portion 55f.

The registration portion 85a is formed at the front end portion of the wrapping start portion 55a (i.e. on a side opposite from the wrapping body portion 55c). Assuming that the thrust direction of the shaft 52 is defined as a direction of width of the registration portion 85a and the wrapping start portion 55a, the width size of the registration portion 85a is set to be longer than that of the wrapping start portion 55a. The shaft 82 is formed with a groove 82a having a flat bottom surface, which is longer than the width size of the registration portion 85a and has the same shape as the groove 52 appearing in FIG. 3C. When wrapping the FPC 85 around the shaft 82, first, the registration portion 85a is brought into contact with the groove 82a, to thereby perform positioning of the FPC 85 with respect to the thrust direction of the shaft 82 (X direction indicated in FIG. 9B). Then, a front edge of the registration portion 85a and a surface edge of the groove 82a are caused to be aligned with each other, whereby positioning of the FPC 85 is performed with respect to a diametrical direction of the shaft 82 (Y direction indicated in FIG. 9B). After completion of the positioning, the FPC 85 is wrapped around the shaft 82 via a double-side tape 88, and when the wrapping of the FPC 85 is performed up to a trailing end portion 88a of the double-side tape 88, the wrapping operation is completed.

Similar to the FPC 55 described hereinabove, when the FPC 85 is wrapped around the shaft 82, it is possible to reduce the repelling force generated by bending the FPC 85 at the start of the wrapping of the FPC 85, since the width size of the wrapping start portion 55a is shorter than that of the wrapping body portion 55c. Here, in the case of the FPC 55, there is a fear that the FPC 55 is liable to be wrapped around the shaft 52 in a state inclined with respect to the shaft 52, since the positioning of the FPC 55 with respect to the shaft 52 is performed at the wrapping start portion 55a having a shorter width size. On the other hand, in the case of the FPC 85, the positioning with respect to the shaft 82 is performed at the registration portion 85a which has a longer width size than the wrapping start portion 55a, so that it is possible to improve the accuracy of the positioning of the FPC 85 with respect to the shaft 82. Further, in the FPC 85, by covering the registration portion 85a with the coverlay for increasing the thickness of the registration portion 85a, it is possible to secure appropriate rigidity, thereby making it possible to perform the positioning of the FPC 85 with respect to the shaft 52 more accurately.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-181309 filed Sep. 5, 2014 which is hereby incorporated by reference herein in its entirety.

What is claimed is:

1. An electronic apparatus including an apparatus main unit and a structure supported rotatably with respect to the apparatus main unit, comprising:
   a shaft that is supported by the apparatus main unit and is disposed in a center of rotation of the structure; and
   a flexible printed circuit board that is wrapped around and held by an outer peripheral surface of said shaft via a joining member,
   wherein said flexible printed circuit board includes:
   a wrapping start portion from which wrapping of said flexible printed circuit board around said shaft is started;
   a wrapping body portion having a wiring portion, a width of said wrapping body portion in a thrust direction of said shaft being larger than a width of said wrapping start portion; and
   an expansion portion that is provided between said wrapping start portion and said wrapping body portion, a width of said expansion portion in the thrust direction of said shaft continuously expanding from the width of said wrapping start portion to the width of said wrapping body portion;

wherein in said flexible printed circuit board, a coverlay opening area where a coverlay is made open is formed in at least said wrapping start portion and said expansion portion, and wherein the coverlay opening area has a length which makes it possible to wrap at least one turn of said flexible printed circuit board around said shaft by using only the coverlay opening area from said wrapping start portion.

2. An electronic apparatus including an apparatus main unit and a structure supported rotatably with respect to the apparatus main unit, comprising:

a shaft that is supported by the apparatus main unit and is disposed in a center of rotation of the structure; and a flexible printed circuit board that is wrapped around and held by an outer peripheral surface of said shaft via a joining member, wherein said flexible printed circuit board includes:

a wrapping start portion from which wrapping of said flexible printed circuit board around said shaft is started;

a wrapping body portion having a wiring portion, a width of said wrapping body portion in a thrust direction of said shaft being larger than a width of said wrapping start portion; and an expansion portion that is provided between said wrapping start portion and said wrapping body portion, a width of said expansion portion in the thrust direction of said shaft continuously expanding from the width of said wrapping start portion to the width of said wrapping body portion;

wherein in said flexible printed circuit board, a coverlay opening area where a coverlay is made open is formed in at least said wrapping start portion and said expansion portion, and wherein an end face of the coverlay opening area has a linear shape parallel to the thrust direction of said shaft or a wavy shape having a direction of displacement corresponding to a diametrical direction of said shaft.

3. An electronic apparatus including an apparatus main unit and a structure supported rotatably with respect to the apparatus main unit, comprising:

a shaft that is supported by the apparatus main unit and is disposed in a center of rotation of the structure; and a flexible printed circuit board that is wrapped around and held by an outer peripheral surface of said shaft via a joining member, wherein said flexible printed circuit board includes:

a wrapping start portion from which wrapping of said flexible printed circuit board around said shaft is started;

a wrapping body portion having a wiring portion, a width of said wrapping body portion in a thrust direction of said shaft being larger than a width of said wrapping start portion; and an expansion portion that is provided between said wrapping start portion and said wrapping body portion, a width of said expansion portion in the thrust direction of said shaft continuously expanding from the width of said wrapping start portion to the width of said wrapping body portion;

wherein a first dummy wiring portion is formed in an area of said wrapping body portion, which is electrically insulated from said wiring portion and is closer to said wrapping start portion than said wiring portion is, with a predetermined gap provided between said first dummy wiring portion and said wiring portion.

4. The electronic apparatus according to claim 3, wherein said first dummy wiring portion has a shape of stripes parallel to the thrust direction of said shaft.

5. The electronic apparatus according to claim 3, wherein said wiring portion includes:

a first linear wiring portion that is parallel to the thrust direction of said shaft;

a second linear wiring portion that is orthogonal to the thrust direction of said shaft; and a curved wiring portion that connects said first linear wiring portion and said second linear wiring portion, wherein a second dummy wiring portion is formed in an area of said wrapping body portion, which is surrounded by said curved wiring portion, said first dummy wiring portion, and an outer shape end of said flexible printed circuit board.

6. The electronic apparatus according to claim 5, wherein said second dummy wiring portion has a shape of stripes parallel to the thrust direction of said shaft.

7. The electronic apparatus according to claim 6, wherein said shaft includes a groove which has a flat bottom surface and to which a registration portion formed on said flexible printed circuit board is bonded.

8. An electronic apparatus including an apparatus main unit and a structure supported rotatably with respect to the apparatus main unit, comprising:

a shaft that is supported by the apparatus main unit and is disposed in a center of rotation of the structure; and a flexible printed circuit board that is wrapped around and held by an outer peripheral surface of said shaft via a joining member, wherein said flexible printed circuit board includes:

a wrapping start portion from which wrapping of said flexible printed circuit board around said shaft is started;

a wrapping body portion having a wiring portion, a width of said wrapping body portion in a thrust direction of said shaft being larger than a width of said wrapping start portion; and an expansion portion that is provided between said wrapping start portion and said wrapping body portion, a width of said expansion portion in the thrust direction of said shaft continuously expanding from the width of said wrapping start portion to the width of said wrapping body portion;

wherein said flexible printed circuit board includes a registration portion which has a longer width in the thrust direction of said shaft than the width of said wrapping start portion, and is formed at a front end of said wrapping start portion, for being bonded to said shaft.

* * * * *